United States Patent [19]

Iwamura et al.

[11] 4,305,187

[45] Dec. 15, 1981

[54] METHOD AND APPARATUS FOR MAKING CONTINUOUS GRIDS FOR LEAD ACID BATTERIES

[75] Inventors: Takahiro Iwamura; Seiichiro Ikeda, both of Takatsuki, Japan

[73] Assignee: Yuasa Battery Company Limited, Takatsuki, Japan

[21] Appl. No.: 36,142

[22] Filed: May 4, 1979

[30] Foreign Application Priority Data

May 9, 1978 [JP] Japan ............................... 53/55115
May 23, 1978 [JP] Japan ............................... 53/62062

[51] Int. Cl.³ ..................... B21D 31/04; H01M 35/04
[52] U.S. Cl. ........................................ 29/2; 29/6.1; 29/6.2
[58] Field of Search ................... 29/2, 6.1, 6.2; 72/203

[56] References Cited

U.S. PATENT DOCUMENTS

| | | | |
|---|---|---|---|
| 1,578,365 | 3/1926 | Redding | 29/6.1 |
| 1,972,179 | 9/1934 | Baker | 29/6.1 |
| 2,989,145 | 6/1961 | Goodloe | 29/6.1 UX |
| 3,276,096 | 10/1966 | McAleer et al. | 29/6.1 |
| 3,867,200 | 2/1975 | Daniels, Jr. | 29/6.1 X |
| 4,102,024 | 7/1978 | Badger et al. | 29/6.2 |

*Primary Examiner*—Horace M. Culver
*Attorney, Agent, or Firm*—Watson, Cole, Grindle & Watson

[57] ABSTRACT

In method and apparatus for making continuous strips for lead acid batteries, a strip of lead is advanced through a plurality of successive stations such that zigzag slits are formed on the strip, either in a direction parallel to the longitudinal axis or inclined to the longitudinal axis of the strip, between belt-shaped unslitted edge portions and a central unslitted portion. The strip is then stretched by application of a continuous force substantially simultaneously to the entire width of the slit portion of the strip by successively larger vertical components normal to the plane of the strip between both unslitted edge portions and the central unslitted portion. Simultaneously therewith, frictional resistance is applied to the zigzag slits so that the strip forms a substantially V-shaped cross-section vertical to the advancing direction of the strip to form the grid cells. The V-shaped strip is then leveled and flattened.

12 Claims, 28 Drawing Figures

METHOD AND APPARATUS FOR MAKING CONTINUOUS GRIDS FOR LEAD ACID BATTERIES

BACKGROUND OF THE INVENTION

1. Field of the Invention

This invention relates to a method and apparatus for making continuous grids for lead acid batteries.

2. Description of the Prior Art

It is generally known that grids for lead acid batteries are made by casting lead or a lead alloy. It has also been recently considered to make grids by punching or expanding a narrow strip of lead or a lead alloy obtained by continuous casting or rolling in advance.

In the method by casting, skilled work is required in a hot environment, the productivity is very low and it is very difficult to make thin grids required for high performance batteries. In the method by punching, there are defects in that a large amount of punching scraps will be produced, a large labor and cost will be required to recover and refine them and material will be wasted. In this respect, in making grids by expanding, substantially no scrap will be produced, the yield rate of the material is high and there is a great advantage that grids can be made thin and light.

However, in the conventional method wherein zigzag slits are formed in a narrow strip in the direction at right angles with the advancing direction of the strip and the strip is expanded in the advancing direction, there have been defects in that it is difficult to form such unslitted portions as the current collecting header, bottom border and lug required for grids of lead acid batteries. Also if such unslitted portions are to be obtained, such that the strip must be worked so as to form no zigzag slit at fixed intervals, the work and apparatus will be complicated and the productivity will be very low.

In order to cope with the above mentioned defects, there is recently considered a producing method wherein zigzag slits parallel with the advancing direction of a narrow strip are formed in the strip and the strip is extended in the direction at right angles with the advancing direction or in the direction vertical to the surface of the strip. In this method, there is a step wherein zigzag slits parallel to the advancing direction of a strip are formed in the strip and then the strip is pulled and extended in the direction at right angles with the advancing direction while being held at the edge portions thereof. However, in this method, there are defects in that errors are likely to be produced in the extended dimension and the respective grid dimensions of the obtained product are hard to be made uniform. On the other hand, there is also considered a method wherein a different die and cutter are provided for each row of slits, a narrow strip is intermittently fed in turn and the die is intermittently driven in the vertical direction to form slits in turn from the edge portions of the strip and, at the same time, the strip is extended along the shape of the die in the vertical direction. However, in this method, there are defects in that the apparatus is complicated and large and that, if the precision of the intermittent feed of the strip is low even slightly, the rows of slits formed with the respective dies and cutters will be likely to become loose and it will be difficult to obtain precision grid cells.

Further, on the other hand, there are defects that the grids made by expanding will be likely to be disconnected by the corrosion and growth during battery use and will be short lived. Particularly, a positive grid made of a lead-calcium alloy will have remarkably high growth during the battery charge-discharge but, as it is fixed in the container of the battery, it will be disconnected early at the connecting portion between the wire-like segments and will have reduced current collecting capacity and will be short lived in most cases.

Further, a grid made by expanding has defects that, as its surface or slitted surface is smoother than the cast surface of a grid made by casting, its area of contact with the pasted active material will be smaller than that of the grid made by casting, therefore the retaining force will be weak, as a result, the current collecting capacity will be low, the active material will shed and the life of the battery will be short.

SUMMARY OF THE INVENTION

An object of the present invention is to provide a method and apparatus for making continuous grids having high performance characteristics, accurate size, excellent current collecting performance and life performance by adopting an expanding method different from such methods as are mentioned above.

The above mentioned and other objects and advantages of the present invention will become more apparent from the following detailed description with reference to the accompanying drawings.

BRIEF DESCRIPTION OF THE DRAWINGS

FIG. 3 (A) and (B) are respectively a front elevational view and side elevational view of an essential part of a slit forming means as shown partly in section.

FIG. 4 (A) and (B) are respectively plan views of strips showing the process of forming zigzag slits by the slit forming means in FIG. 3 (A) and (B).

FIG. 5 (A) and (B) are respectively a front elevational view and side elevational view showing another embodiment of the slit forming means partly in section.

FIG. 6 (A) and (B) are respectively partial plan views of strips showing in turn the process of forming zigzag slits.

FIG. 9 (A) and (B) are plan views showing a strip in an widening process respectively before and after being widened.

FIG. 12 (A) and (B) are partial plan views of continuous grids according to the present invention respectively when grids or battery plates are punched.

DETAILED DESCRIPTION OF PREFERRED EMBODIMENTS

Figure 1:
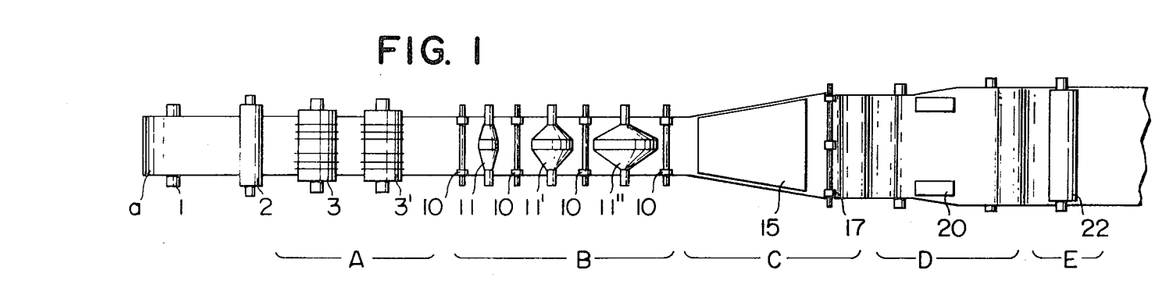
FIGS. 1 and 2 are respectively a schematic plan view and side elevational view showing an embodiment of the manufacturing apparatus of the present invention.
Figure 2:
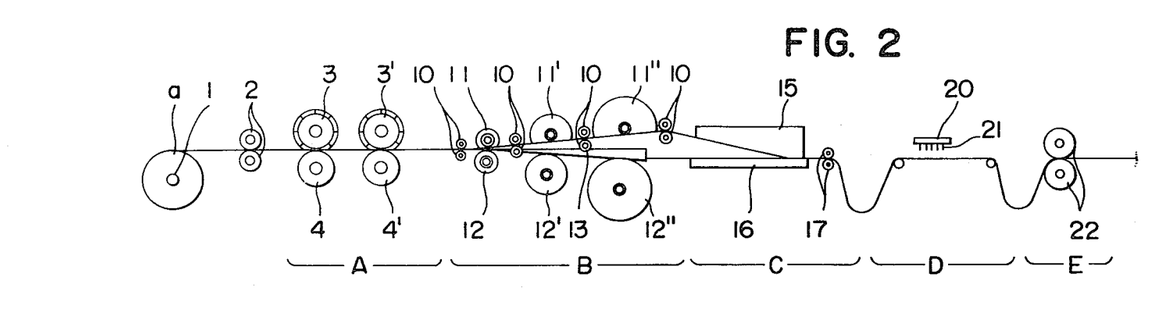
Figure 3A:
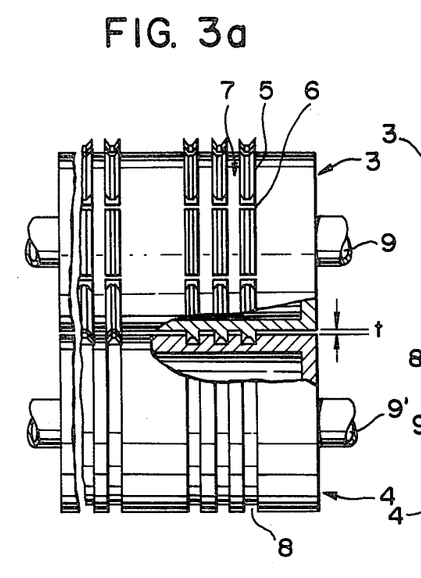
Figure 3B:
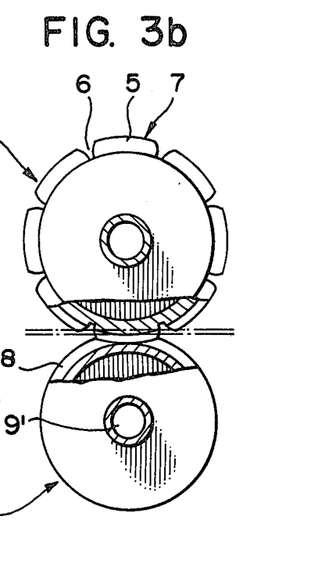

In the drawings, a is a narrow strip of lead or a lead alloy wound on a pay-off reel 1 in advance. 2 is a pair of upper and lower feed rollers having shafts connected to an electric motor through a reduction gear not illustrated. The strip a is fed at a constant velocity to a slit forming step A by the feed rollers 2. Slit forming step A is provided with a slit forming means such as first cutting edged roller cutter 3, first grooved roller cutter 4, second cutting edged roller cutter 3' and second groove roller cutter 4' as are shown in FIG. 3. A plurality of projecting cutting edge rows 7 having projecting cutting edges 5 and interrupted portions 6 alternately at regular intervals are formed parallelly with the advancing direction of the strip a on the first and second cutting edge roller cutters 3 and 3'. On the other hand, the first and second grooved roller cutters 4 and 4' are arranged at a spacing of the held width t (See FIG. 3 (A).) of the strip a respectively from the first and second cutting edged roller cutters 3 and 3' and annular grooves 8 engaging with the projecting cutting edge rows 7 are formed on them. Further, the shafts 9 and 9' are made hollow so that cooling water may be circulated through them through rotary joints or the like. By the way, it is possible to use Freon gas or the like for cooling.

Figures 4A, 4B:
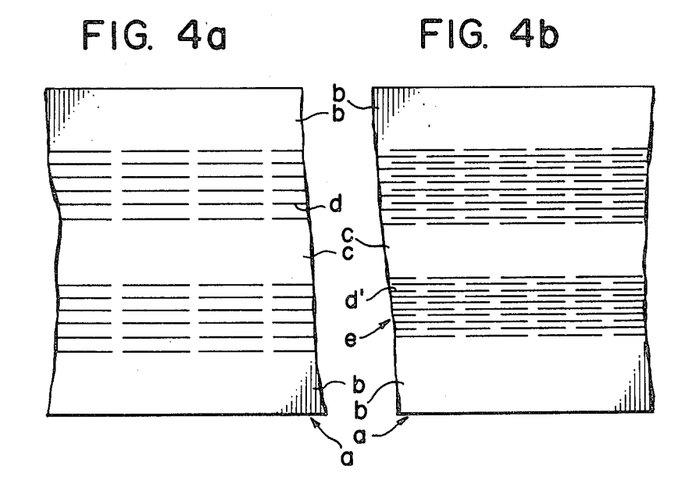

The shafts of the first and second grooved roller cutters 4 and 4' are provided with sprockets for roller chains which are ordinary power transmitting means though not illustrated and transmitting gears so that the rotations of the feed rollers may be transmitted through the roller chains, the above mentioned transmitting gears may mesh to cooperate with transmitting gears (not illustrated) provided on the shafts of the cutting edged roller cutters 3 and 3' and thereby the above cutting edged and grooved roller cutters 3, 4 and 3', 4' may rotate at the same speed as of the feed rollers 2. Slits d parallel with the advancing direction and having a cutting width twice as large as the required cutting width will be formed by leaving belt-like unslitted portion b on both edges and an unslitted portion c in the center as shown in FIG. 4 (A) with the first cutting edged and grooved roller cutters 3 and 4 rotating at the same speed as the feeding speed of strip a fed in slit forming step A. Then slits d' will be formed zigzag intermediately between the slits d made with the first cutting edged and grooved roller cutters 3 and 4 as shown in FIG. 4 (B) with the second cutting edged and grooved roller cutters 3' and 4' and, as in the above, zigzag slits e will be formed on the strip a.

Further, as cooling water is circulated through the first and second cutting edges and grooved roller cutters 3, 3' and 4, 4', even if a high speed cutting is made, the temperature of the strip a will not rise, strip a will be able to be prevented from being softened and deformed and high zigzag slits will be able to be formed.

Figures 5A, 5B:
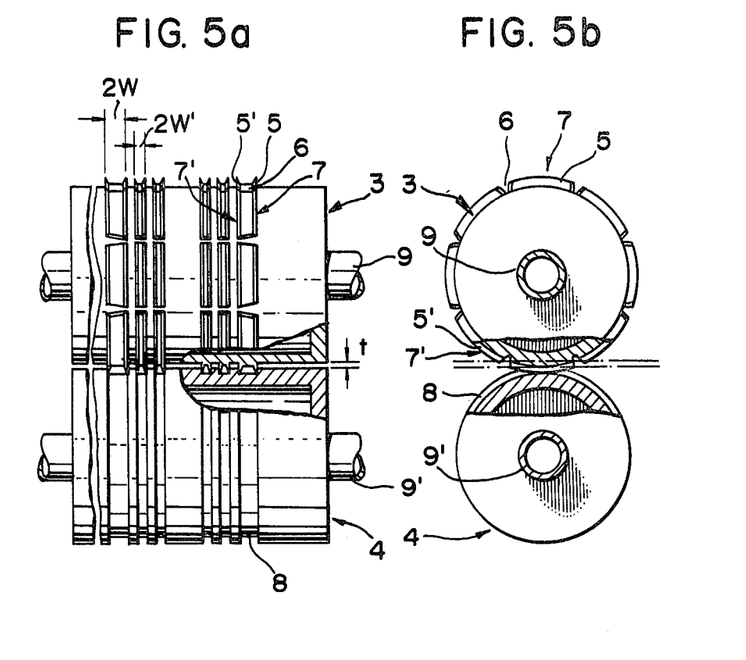
Figures 6A, 6B:
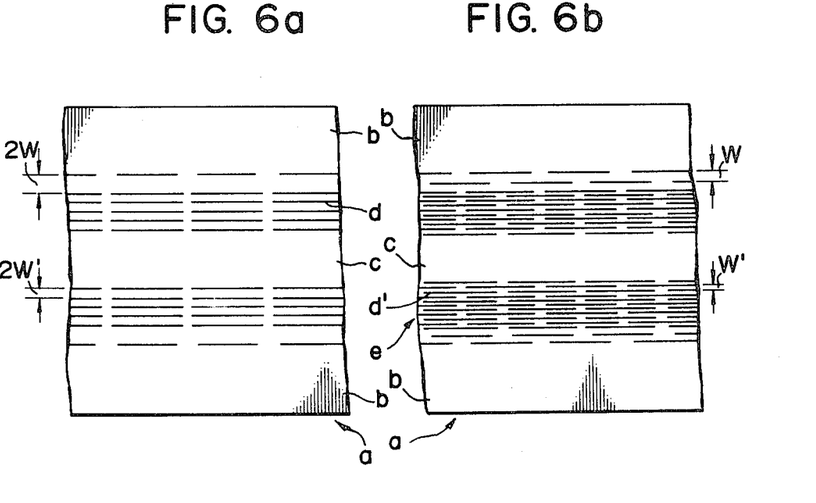

FIG. 5 (A) and (B) show another embodiment of the slit forming means. 3 is a cutting edged roller cutter and 4 is a grooved cutter. A plurality of projecting cutting edge rows 7 and 7' having projecting cutting edges 5 and 5' and interrupted portions 6 alternately at regular intervals are formed in planes vertical to the axial direction on the periphery of said cutting edged roller cutter 3. Projecting cutting edge rows 7 and 7' are arranged at a spacing twice as large as the desired cutting width of the sheet material. That is to say, the projecting cutting edge row on the outside edge and the next projecting cutting edge row 7' are arranged at a spacing of 2W and the other projecting cutting edge rows 7' are arranged at a spacing of 2W' between themselves. Further, the projecting cutting edge 5 on the outside edge is made shorter than the other projecting cutting edges 5'. On the other hand, the grooved roller cutter 4 is arranged at a spacing of the holding width t (See FIG. 5 (A).) from the cutting edged roller cutter 3 and annular grooves 8 engaging with the projecting cutting edge rows 7 are formed on it. The shafts 9 and 9' are made hollow so that cooling water may be circulated through them through rotary joints or the like. By the way, it is possible to use Freon gas or the like for cooling. Slits d parallel with the advancing direction and having a cutting width twice as large as the required cutting width will be formed by leaving the belt-like unslitted portions b on both edges and the unslitted portion c in the center as shown in FIG. 6 (A) with the cutting edged and grooved roller cutters 3 and 4 rotating at the same speed as the feeding speed on the sheet material fed to the slit forming means. That is to say, the width between the slit rows on the outside edge will be made 2W, the width between the slit rows on the center side will be made 2W', the slit length on the outside edge will be made shorter than the other slit length and further the slit distance on the outside edge will be made longer than the other slit distance. The slit d' will be formed in a zigzag pattern intermediately between the slits made with the first cutting edged and grooved roller cutters 3 and 4 as shown in FIG. 6 (B) with the second cutting edged and grooved roller cutters 3' and 4' having projecting cutting edge rows in the intermediate positions between the above mentioned respective slit rows; and zigzag slits e in which the width W of the slit row at the outside end is wider than the width W' of the slit row on the center side; and the slit distance at the outside end is longer than the slit distance on the center side will be formed on the strip a.

By the way, in this embodiment, an apparatus provided with two pairs of cutting edged and grooved roller cutters is exemplified. However, it is possible to narrow the slit width by increasing the cutting edge and grooved roller cutters to be an even number of pairs and thereby fine grids can be obtained.

Figure 7:
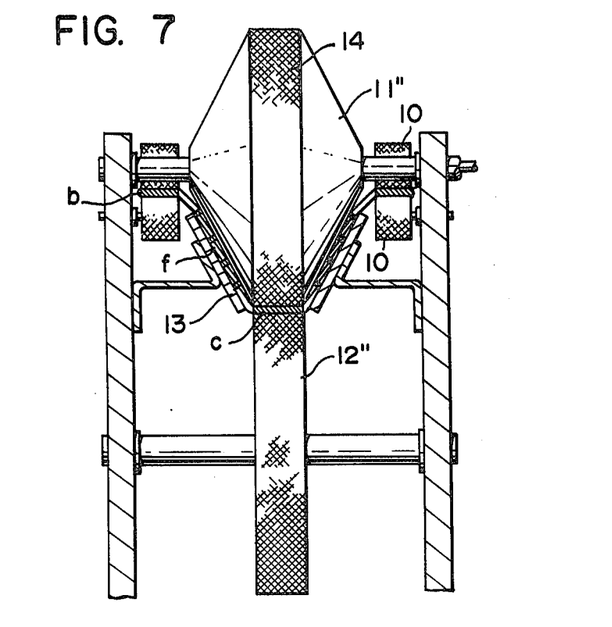
FIG. 7 is a front sectioned view of a stretching means.

Then the strip a will be fed to a stretching step B. Such stretching means as is shown in FIG. 7 is provided in stretching step B. That is to say, stretching means is provided with a plurality of rows of rollers 10 feeding the strip a at a constant speed, a plurality of convex rollers 11, 11' and 11" and non-powered rollers 12, 12' and 12" are paired respectively with convex rollers 11, 11' and 11". The roller 10 is formed to hold the strip a in both unslitted edge portions thereof and is khurled or made of rubber. The convex rollers 11, 11' and 11" are spindle-shaped, the largest peripheral length portion 14 in the center has a width the same as, or a little narrower than, the width of the unslitted portion in the center of the strip a and is knurled. The non-powered rollers 12, 12' and 12" are knurled or are made of rubber and are paired respectively with the convex rollers 11, 11' and 11". The holding positions of the convex rollers 11, 11' and 11" and the non-powered rollers 12, 12' and 12" are staggered in the vertical direction from the plane made by the holding positions of the plurality of the rollers 10 as shown in FIG. 7, that is, in other words, the unslitted portion c in the center is held in a position lower than the unslitted portions b of both edges. The convex rollers 11, 11' and 11" are so designed as to become steppedly larger in the diameter of the largest peripheral length portion 14 in the advancing direction of the strip. Further, the plurality of the rows of rollers 10 are made to rotate at the same peripheral speed as the feed rollers 2. A power transmitting means made by combining gears or the like is provided so that the plurality of the convex rollers 11, 11' and 11" may rotate with the largest peripheral length portions 14 in the central portions at the same peripheral speed as feed roller 2.

The strip a in stretching step B will be fed by being held in both unslitted edge portions b. The convex rollers 11, 11' and 11" will rotate at the same peripheral speed as the feeding speed of both unslitted edge portions of the strip a and will hold the strip a in the unslitted portion c in the center with the non-powered rollers 12, 12' and 12". As in the above description, a force including a vertical component normal to the plane of the strip will be applied between both unslitted edge portions b and central unslitted portion c of the strip a, the zigzag slits e will be stretched in turn so that strip a may be substantially V-shaped in cross-section and thus grid cells f will be formed. The stretching rate of the grid cells f will be determined by the distance between the unslitted edge portions b and the central unslitted portion c in the final convex roller 11".

A guide 13 will act to give a proper frictional resistance to the zigzag slits e of the strip a being stretched to uniformly stretch the zigzag slits e.

By the way, in this embodiment, an apparatus in which a plurality of convex rollers 11, 11' and 11" are used is exemplified. However, such rollers may be single and may be non-powered. Otherwise, there are considered various embodiments wherein no convex roller is used, the strip a is made to contact a guide block having a predetermined surface and a force including a vertical component normal to the plane of the strip is applied between both unslitted edge portions b and central unslitted portion c to stretch the zigzag slit groups e of the strip a.

Figure 8:
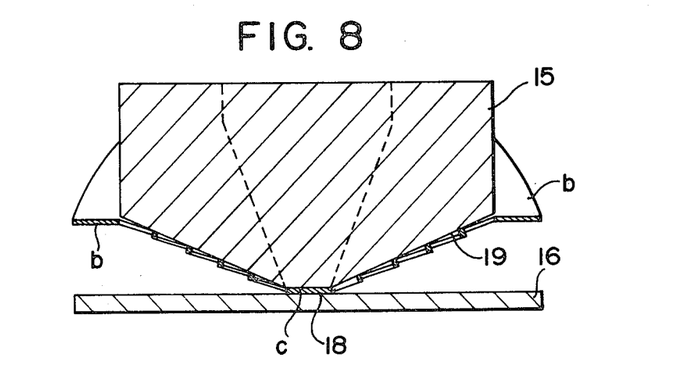
FIG. 8 is a front sectioned view of a leveling means.

Then the strip a will be fed to a leveling step C. Such leveling means as is shown in FIG. 8 is provided in leveling step C. That is to say, the leveling means is provided with a guide block 15, a plate 16 and pull-out rollers 17 shown in FIG. 1. Leveling guide block 15 has a horizontal bottom surface 18 having a width the same as or a little narrower than the width of the central unslitted portion c of the strip a, has in the front an angle of inclination along the substantially V-shaped shape of the cross-section of the strip as fed from the stretching step B as shown by the dotted lines in FIG. 8, and has on both sides of the horizontal bottom surface inclined curved surfaces 19 whose angle gradually becomes an obtuse angle in the advancing direction of the strip and which become horizontal at the back. The plate 16 is arranged with a strip passing gap from the horizontal bottom surface 18 of the block 15 below the leveling guide block 15.

The pull-out roller 17 is made to rotate at the same peripheral speed as the feed roller 2.

The strip a fed to leveling step C will be passed between the leveling guide block 15 and the plate 16 to be flatly leveled and will be pulled out by the pull-out roller 17.

Figure 9A:
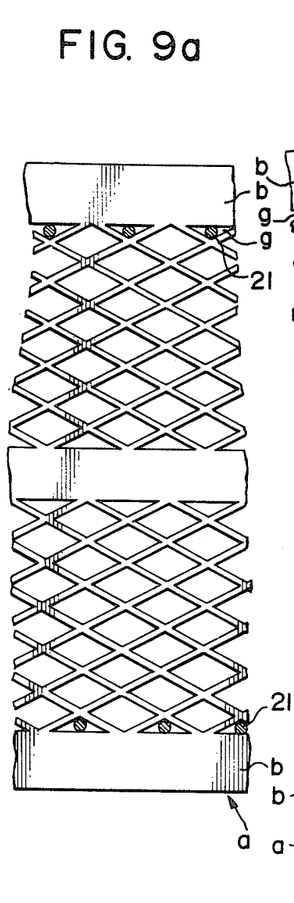
Figure 9B:
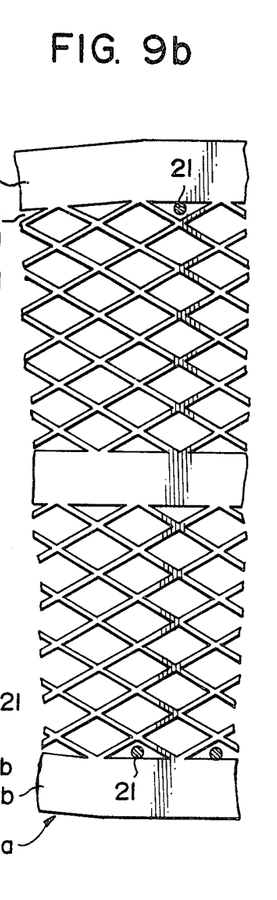

Then the strip will be fed to a widening step D wherein a widening means is provided. That is to say, the widening means is provided with a widening plate 20. Widening plate 20 has a plurality of projecting bars 21 to be passed through the grid cells g (See FIG. 9.) on the outermost edges of the strip. That is to say, as shown in FIG. 9 (A), projecting bars 21 will be passed through the grid cells g on the outermost edges of the strip a, then will move in the width direction of the strip a to widen the strip to be of a fixed width between both unslitted edge portions as shown in FIG. 9 (B), will then advance in the advancing direction of the strip to feed the strip a by a fixed pitch, then will move in the directions reverse to the width direction of the strip a until they no longer contact both unslitted edge portions b of the strip a, will be pulled and than will retreat. By repeating this operation, the strip a will be widened by 0 to about 10 mm in width to be wider then before widening step D and to be uniform in the width dimension.

Figure 10:
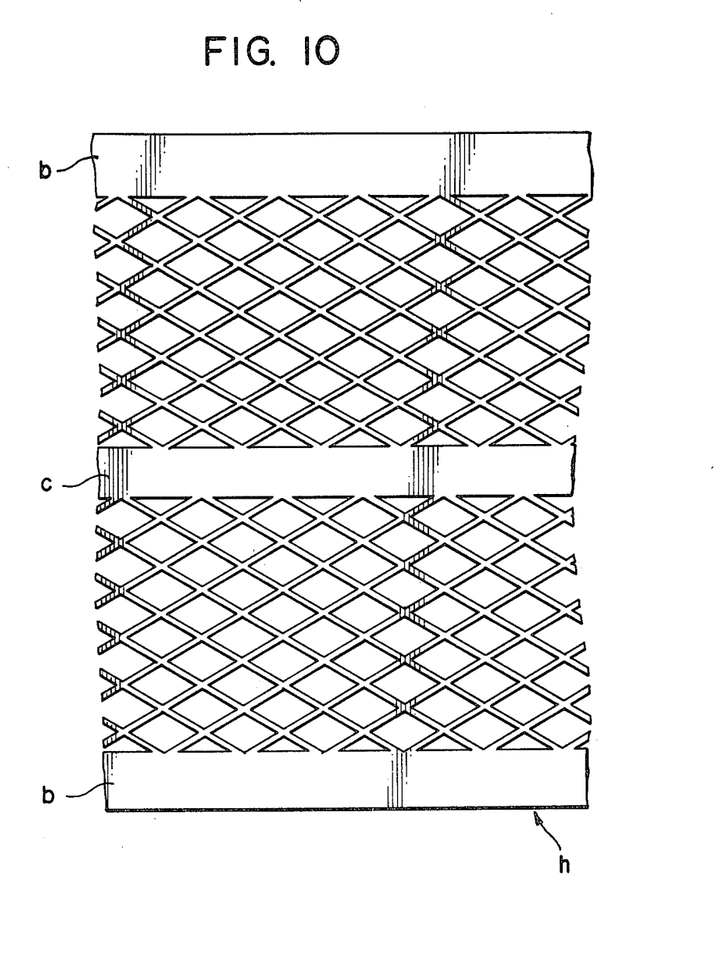
FIGS. 10 and 11 are partial plan views of continuous grids obtained from the strips on which zigzag slits are formed as shown respectively in FIG. 4 (B) and FIG. 6 (B).

Then the strip a will be fed to a flattening step E wherein a flattening means provided with thickness flattening rolls 22 arranged above and below at a predetermined spacing is provided in said flattening step E. The strip a will be pressed by thickness flattening rolls 22 to be flattened to a thickness a little smaller than before flattening step E and will become a continuous grid h as is shown in FIG. 10.

Figure 11:
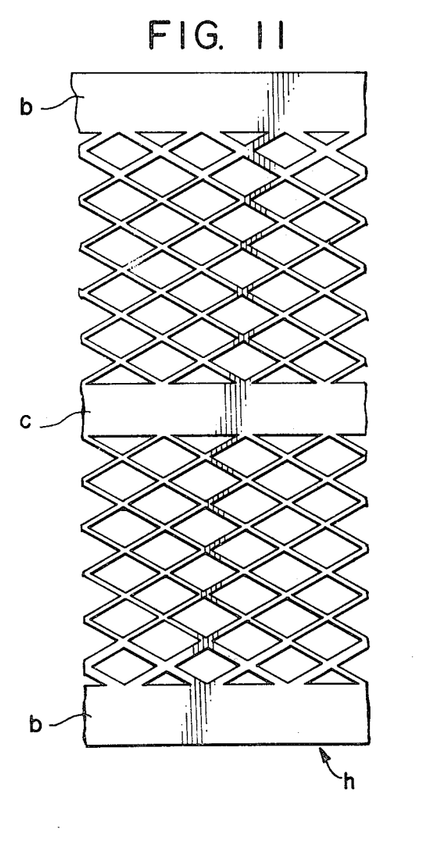

By the way, in the slit forming step A, in case strips such as shown in FIG. 6 (B) are formed by using such slit forming means as is shown in FIG. 5, there will be made continuous grids h wider in the wire-like segments near both unslitted edge portion b than in the wire-like segments near the central unslitted portion c as shown in FIG. 11.

Figure 12A:
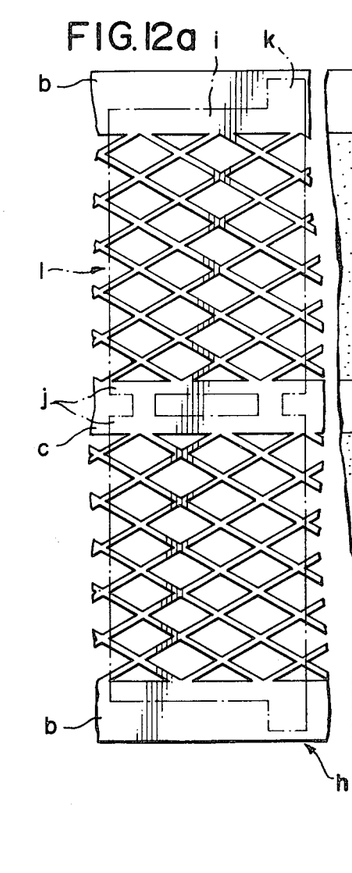

The continuous grids h obtained as in the above description can be preserved and wound up in the form of coils and can be fed directly to the next step. In the next step, as shown in FIG. 12 (A), two grids 1 each having a current collecting header i, bottom border j and lug k can be punched as parallelly arranged in the width direction of the continuous grids h and then can be pasted with an active material by means of a conventional pasting machine to obtain battery plates, or alternatively can be pasted with an active material m by connecting the pasting machine, drying over and punching machine and then can be punched to make battery plates n.

Figure 12B:
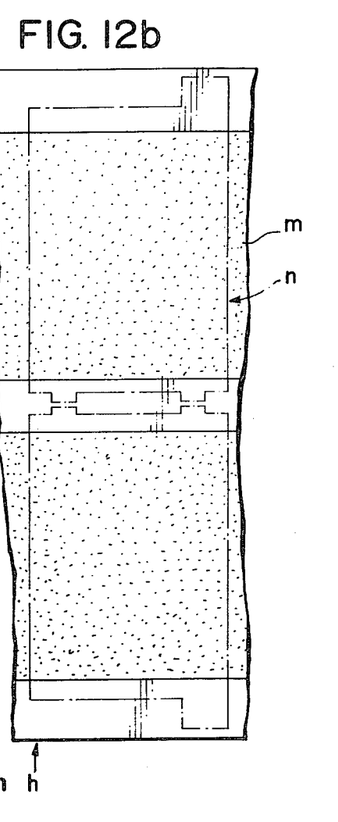

By the way, in the case of punching the strip as grids or battery plates, in FIG. 12, the current collecting headers and current collecting lugs k are shown to be obtained from both unslitted edge portions b of the continuous grids h. However, it is possible to punch the strip so as to obtain current collecting headers and lugs from the central unslitted portion C. In this case, the width between the projecting cutting edge row forming the slit row on the central unslitted portion side (shown by the symbol α in FIG. 5) and the next projecting cutting edge of the slit forming means shown in FIG. 5 will be made larger than the width between the other projecting cutting edges themselves to effectively obtain continuous grids in which the width of the wire-like segments near the central unslitted portion c is larger than the width of the wire-like segments near each of both unslitted edge portions b.

Figure 13:
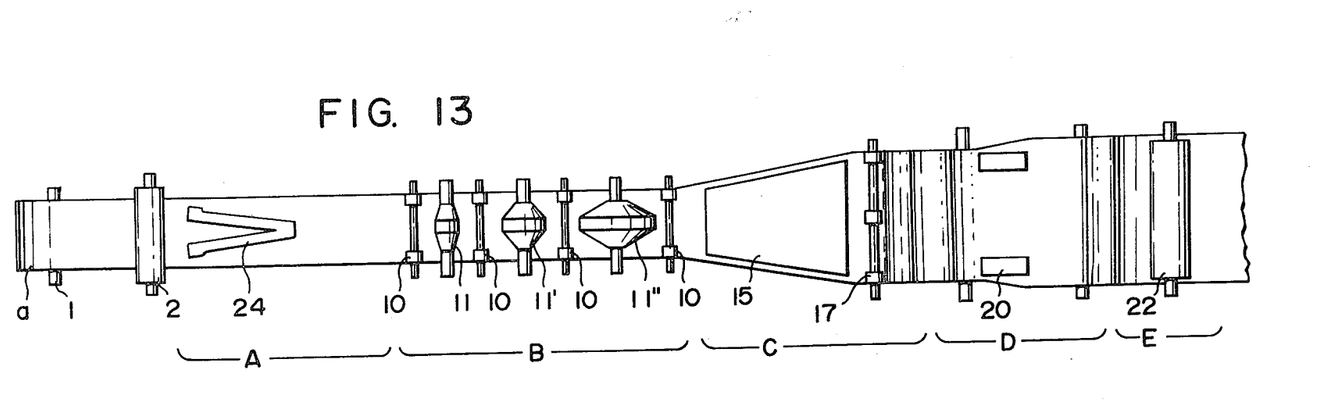
FIGS. 13 and 14 are a schematic plan view and side elevational showing another embodiment of the manufacturing apparatus of the present invention.
Figure 14:
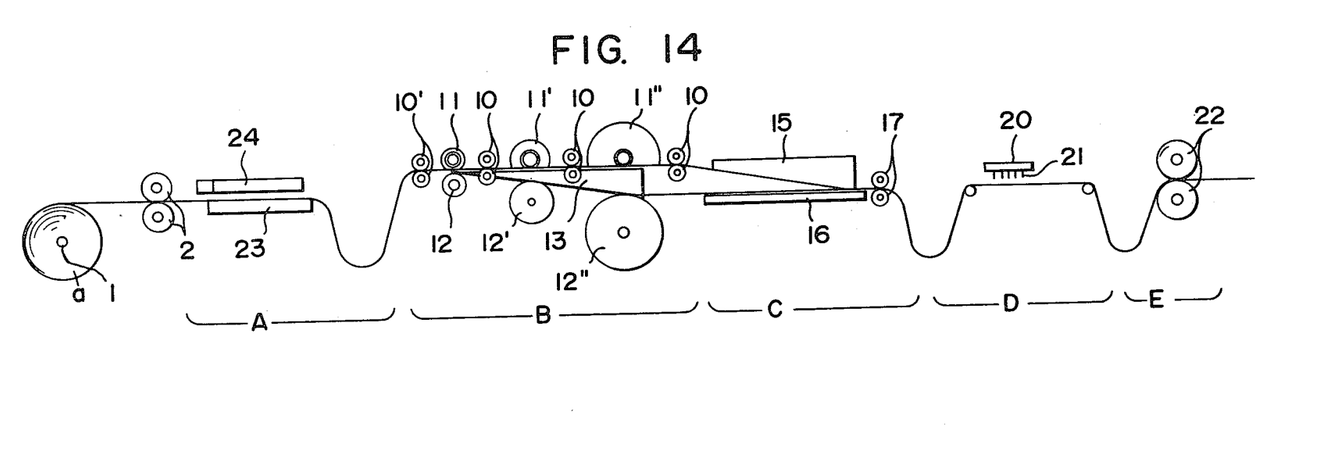
Figure 15:
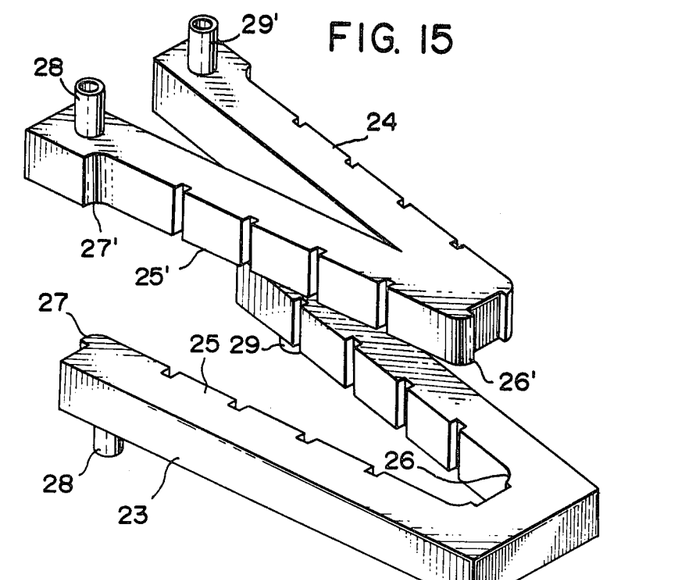
FIG. 15 is a perspective view of an essential part of the slit forming means of the apparatus shown in FIGS. 13 and 14.

In FIGS. 13 and 14, a is a strip of lead or a lead alloy wound on a pay-off reel 1 in advance. Strip a will be intermittently fed to a slit group forming step by a pair of upper and lower rollers 2. Such slit forming means as is shown in FIG. 15 is provided in slit forming step A. The slit forming means is provided with a fixed lower cutter 23 and an upper cutter 24 movable in the vertical direction. Lower cutter 23 has a substantially V-shaped surface of contact with the strip a and has cutting edges 25 formed along the inside walls of the V-shaped surface. The upper cutter 24 has cutting edges 25′ formed along its outside walls so as to engage with the cutting edges 25 of the lower cutter 23. R-shaped parts 26, 26′, 27 and 27′ extended in the form of curves as illustrated are formed respectively on the end edges of cutting edges 25 and 25′ along the non-edged portions inside and outside the lower and upper cutters 23 and 24. Further, cooling water inlets 28 and 28′ and cooling water outlets 29 and 29′ are provided respectively on the lower and upper cutters 23 and 24 so as to circulate cooling water through the lower and upper cutters 23 and 24. By the way, it is also possible to use Freon gas or the like for cooling.

Figure 16:
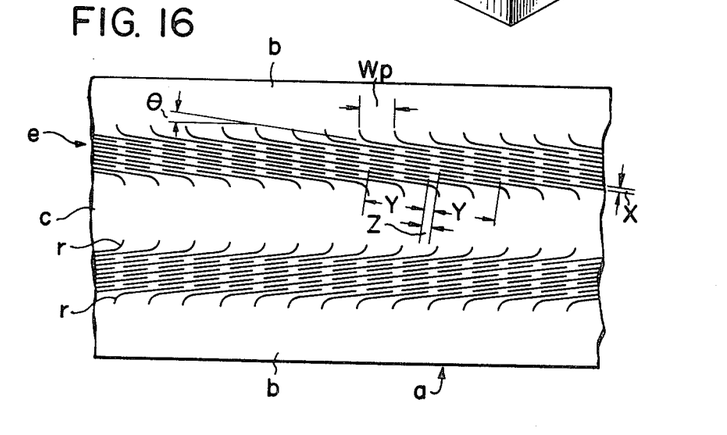
FIG. 16 is a partial plan view of a strip on which zigzag slits are formed by the slit forming means in FIG. 15.

The upper cutter 24 will be made to act in each intermittent feed of strip a to form zigzag slits inclined to the advancing direction of the strip by leaving the belt-shaped unslitted edge portions b and central unslitted portion c as in FIG. 16. Now, if the cutting width of the slit group e is X, the length of the slit is Y and the distance from one slit to the next slit is Z, the angle $\theta$ of inclination will be arc tan $2X/(Y+Z)$ and the pitch Wp of the intermittent feed will be determined by $\sqrt{X^2 + \frac{1}{4}(Y+Z)^2}$.

Further, R-shaped slits $\gamma$ will be formed in the slits along both unslitted edge portions and central unslitted portion c. R-shaped slits $\gamma$ will disperse stresses applied between both edge and central unslitted portions b and c and the zigzag slits e and will prevent the strip from being disconnected in those portions.

As cooling water is circulated through the lower and upper cutters 23 and 24, even if a high speed cutting is made, the temperature of the strip will not rise, and strip a is prevented from being softened and deformed such that precision zigzag slits can be formed.

Figure 17:
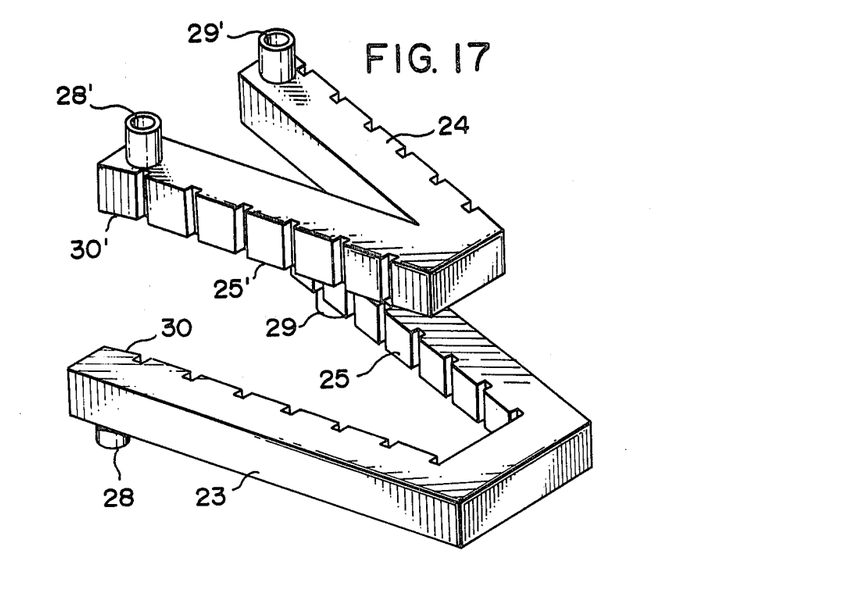
FIG. 17 is a perspective view of an essential part showing another embodiment of the slit forming means.

FIG. 17 shows another embodiment of the slit forming means. 23 is a fixed lower cutter and 24 is an upper cutter movable in the vertical direction.

The lower cutter 23 has a substantially V-shaped surface of contact with the strip a and has lower cutting edges 25 and 30 formed along the inside walls. The upper cutter has upper cutting edges 25′ and 30′ formed along the outside walls so as to engage respectively with the lower cutting edges 25 and 30. An angle $\theta_1$ made by the outermost lower and upper cutting edges 30 and 30′ respectively of the lower and upper cutters 23 and 24 with the direction of the center axis, and an angle $\theta_1′$ made by the other lower and upper cutting edges 25 and 25′ with the direction of the center axis are formed to be in the relation of $\theta_1 > \theta_1′$. The lower and upper cutters 23 and 24 are provided respectively with cooling water inlets 28 and 28′ and cooling water outlet 29 and 29′ so as to continuously circulate cooling water through the lower and upper cutters 23 and 24. It is also possible to use Freon gas or the like for cooling.

Figure 18:
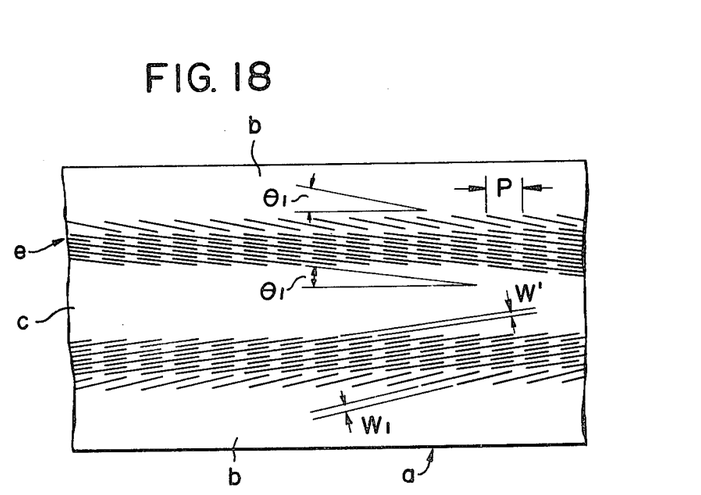
FIG. 18 is a partial plan view of a strip on which zigzag slits are formed by the slit forming means of FIG. 17.

When the upper cutter 24 is made to act in each intermittent feed of the strip a fed to the above mentioned slit forming means, zigzag slits e inclined to the advancing direction will be formed by leaving the belt-shaped unslitted edge portions b and central unslitted portion c as in FIG. 18. That is to say, if the pitch of this intermittent feed is P, the cutting width $w_1$ between the slits themselves near both unslitted edge portions b will be $w_1 = P \sin \theta_1$ and the cutting width $W_1′$ between the other slits will be $W_1′ = P \sin \theta_1′$. As $\theta_1 > \theta_1′$, $w_1$ will be $w_1 = P \sin \theta_1 > p \sin \theta_1′ - w_1′$. The width of the wire-like segment near each of both unslitted edge portion b will be found to be wider than the width of the other wire-like segment.

Then the strip a will be fed to the stretching step B. Such already described stretching means as is shown in FIG. 7 is provided in stretching step B.

The strip a fed in step B will be held in both unslitted edge portions b by the rollers 10 and will be fed at a constant speed. That is to say, if the strip is to be synchronized with the slit forming step A, it will be fed at an average speed in the slit forming step A. The convex rollers 11, 11′ and 11″ will rotate at such peripheral speed as is the same speed as the feeding speed of both unslitted edge portions b of the strip a and will hold the strip a in the central unslitted portion c with the non-powered rollers 12, 12′ and 12″. As in the above, a force including a vertical component to the plane will be applied between both unslitted edge portions b and the central unslitted portion, the zigzag slit groups e will be stretched in turn so that strip a may be substantially V-shaped in cross-section and grid cells f will be formed. The stretching rate of the grid cells f will be determined by the difference between the distance for which both unslitted edge portions move and the distance for which the central unslitted portion c moves. On which side the slits of the zigzag slits e are inclined with respect to the advancing direction of the strip will be determined by which distance is longer.

Then the strip a will be fed to the leveling step C. Such already described leveling means as is shown in FIG. 8 is provided in leveling step C. The strip a will be passed between the leveling guide block 15 and the plate 16 so as to be flatly leveled and will be pulled out by the pullout rollers 17 driven at the same speed as the feeding speed.

Then the strip a will be fed to the widening step D. The already described widening means provided with the widening plates 20 having many projecting bars 21 is provided in widening step D. As is explained in the above mentioned embodiment, the strip will be uniformly widened by 0 to about 10 mm in width.

Figure 19:
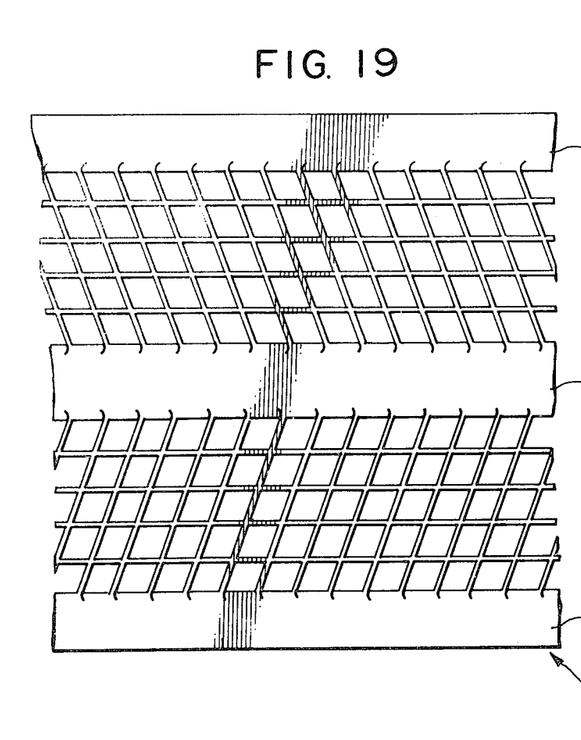
FIGS. 19 and 20 are partial plan views of continuous grids obtained from strips on which zigzag slits are formed as shown respectively in FIGS. 16 and 18.
Figure 20:
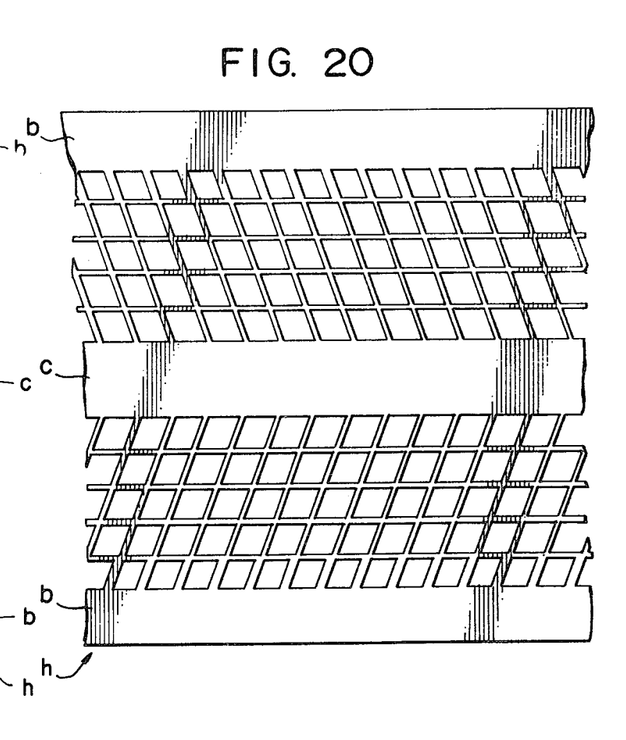

Then the strip a will be fed to the flattening step E. The already described flattening means provided with the thickness flattening rolls 22 is provided in flattening step E. As is explained in the above mentioned embodiment, the strip a will be pressed to be flattened to be a little thin and will become such continuous grids h as are shown in FIG. 19. By the way, in the slit forming step A, in case such slits as are shown in FIG. 18 are formed by using such slit forming means as in FIG. 17, there will be obtained continuous grids h in which the width of the wire-like segment adjacent to each of both unslitted edge portions b is wider than the width of the other wire-like segment. If these continuous grids h are punched into respective grids so that both unslitted edge portions b may be current collecting headers, there will be able to be obtained grids in which the cross-sectional area of the wire-like segment adjacent to the current collecting header is larger than the cross-sectional area of the other wire-like segment.

Figure 21:
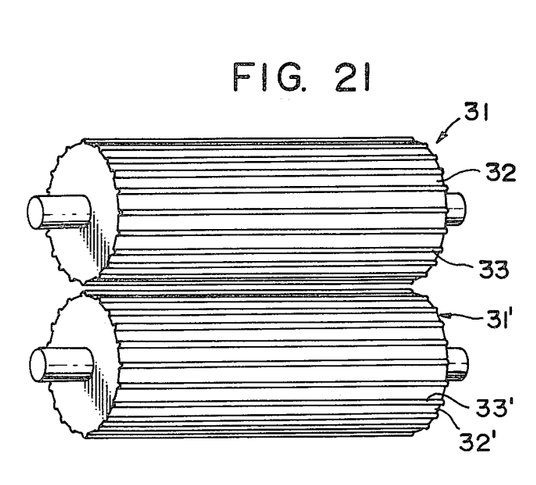
FIG. 21 is a perspective view showing a means of forming a plurality of grooves on the surface of a strip.

FIG. 21 shows another embodiment of the invention wherein there is a grooving means for forming a plurality of grooves on the surface of the strip. The grooving means is provided with rollers 31 and 31' having ribs on the surfaces. A plurality of ribs 33 and 33' projecting out of the roll surfaces and extending parallelly with the length direction of the rolls are formed at regular intervals on the surfaces 32 and 32' of the rollers. The grooving means is provided in the front stage of the slit forming step A in FIGS. 1, 2, 13 and 14, that is, before or after the feed rolls 2 and is driven at the same peripheral speed as the speed at which the feed rolls 2 feed the strip a. In some cases, ribs may be formed on the surfaces of the feed rolls 2 so that the rolls 2 themselves may be also a grooving means.

The strip a fed to the grooving means will be pressed on the surfaces by the ribs 33 and 33' formed respectively on the surfaces 32 and 32' of the rolls 31 and 31' so that a plurality of grooves intersecting at right angles with the advancing direction of the strip may be formed at regular intervals.

Figure 22:
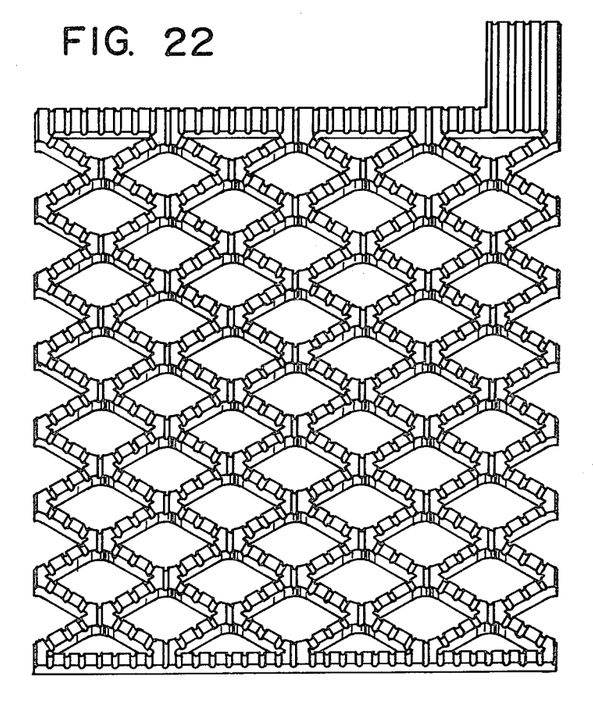
FIG. 22 is a perspective view of a grid having a plurality of grooves formed on the surface by the groove forming means shown in FIG. 21.

The strip a having many grooves formed on the surfaces will then become continuous grids through the slit forming step A, stretching step B, leveling step C, widening step D and flattening step E the same as in the above mentioned embodiments. If the continuous grids are punched into respective grids, such grids having a plurality of convex and concave shaped portions formed on the surfaces as in FIG. 22 will be obtained.

The present invention consists of such method and apparatus as described above and afford such advantages and features as in the following:

(1) The continuous grids of the present invention are made by expansion and can be made thin and light.

(2) In the present invention, grid cells are formed by stretching a strip in the width direction, therefore unslitted portions can be left and current collecting headers, bottom borders and lugs necessary for the grids can be integrally formed.

(3) The present invention has a widening step and flattening step. In the stretching step and leveling step, the strip not yet completely leveled will be widened in the width direction and pressed in the thickness direction to be flattened and therefore high precision width and thickness grid dimensions can be obtained.

(4) In the present invention, the cross-sectional area of the wire-like segment near the current collecting header can be made so large that grids in which the wire-like segment near the current collecting header will be hard to disconnect as a result of corrosion and grid growth while the battery is being used, and will have a long life and will have high current collecting performance.

(5) In the present invention, as a plurality of convex and concave shapes can be formed on the surfaces of the grids, the area of contact with active material will be large, the active material retaining force will be strong, the grid life will be longer and the current collecting performance will be high.

(6) In the present invention, as the apparatus is comparatively and the slit forming means is provided with a cooling system, even if continuous grids are made at a high speed, the strip will not be softened or deformed and a high productivity rate will be able to be maintained.

As in the above, according to the present invention, continuous grids of an excellent quality can be obtained at a high productivity rate and the industrial value thereof is very high.

In the above description, some preferred embodiments of the present invention have been described. However, the present invention is not limited to such specific embodiments. It is needless to say that various modifications are possible without departing from the spirit of the present invention and the appended claims.

What we claim is:

1. A method of making continuous grids for lead acid batteries by advancing a strip of lead or a lead alloy along the longitudinal axis thereof comprising the steps of: forming zigzag slits in the strip between belt-shaped unslitted edge portions and a central unslitted portion, stretching the strip by application of a continuous force simultaneously to the entire width of the slit portion of the strip and including successively larger vertical components normal to the plane of said strip between both unslitted edge portions and the central unslitted portion and further including the simultaneous application of frictional resistance to the zigzag slits so that said strip forms a substantially V-shaped cross-section vertical to the advancing direction to form grid cells, and leveling said substantially V-shaped strip.

2. The method of making continuous grids as claimed in claim 1 in which the step of forming zigzag slits includes forming first slits spaced parallel to and in the advancing direction of the strip and also forming second slits spaced parallel to and in the advancing direction of the strip between the parallel spacing of said first slits with the spacing of said first and second slits in the advancing direction of said strip being staggered with respect to one another, thereby forming the zigzag slits on the strip of lead, and said step of stretching includes feeding both unslitted edge portions and the central unslitted portion of said strip at the same speed.

3. The method of making continuous grids as claimed in claim 1 in which the step of forming zigzag slits includes forming first slits spaced in inclined relationship to the longitudinal axis formed by the advancing direction of the strip and spaced along said inclined axis, and also forming second slits spaced parallel to and between the parallel spacing of said first slits and also spaced along the inclined direction thereof, with the spacing of said first and second slits in the inclined direction being staggered with respect to one another, thereby forming zigzag slits inclined with respect to said longitudinal axis on the strip, and said step of stretching includes displacing both unslitted edge portions of the strip from said central unslitted portion.

4. A method of making continuous grids as in claim 1 further comprising the step of intermittently feeding the leveled strip of lead and applying a force between both unslitted edge portions of the strip during the times when the strip is stopped during the intermittent feeding thereof to substantially uniformly flatten the width of the grid cells, and a step of flattening the grid cells to be substantially uniform in thickness.

5. The method of making continuous grids as in claim 4 in which the step of forming zigzag slits includes forming first slits spaced parallel to and in the advancing direction of the strip, and also forming second slits spaced parallel to and in the advancing direction of the strip between the parallel spacing of said first slits with the spacing of said first and second strips in the advancing direction of the strip being staggered with respect to one another, thereby forming the zigzag slits on the strip of lead, and said step of stretching includes feeding both unslitted edge portions and the central unslitted portion of the strip at substantially the same speed.

6. The method of making continuous grids as claimed in claim 4 in which the step of forming zigzag slits includes forming first slits spaced in inclined relationship to the longitudinal axis formed by the advancing direction of the strip and spaced along said inclined axis, and also forming second slits spaced parallel to and between said first slits and also spaced along the inclined direction thereof, with the spacing of said first and second slits in the inclined direction being staggered with respect to one another, thereby forming zigzag slits inclined with respect to said longitudinal axis on the strip of lead, and said step of stretching includes displacing both unslitted edge portions of the strip from said central unslitted portion.

7. Apparatus for making continuous grids for lead acid batteries by advancing a strip of lead or a lead alloy along the longitudinal axis thereof, comprising:

a slit-forming means for forming zigzag slits in the strip between belt-shaped unslitted edge portions and a central unslitted portion, and including a first cutting edge roller having projecting cutting edge rows substantially parallel to the advancing direction of the strip, a first grooved roller cutter spaced with respect to said first cutting edge roller and having annular grooves engaging with said projecting cutting edge rows, a second cutting edge roller having projecting cutting edge rows substantially parallel to the advancing direction of said strip, a second grooved roller cutter spaced with respect to said second cutting edge roller and having annular grooves engaging with said projecting cutting edge rows of said second cutting edge roller;

a plurality of stretching means for applying a force having a vertical component to the plane of the strip between both unslitted edge portions and said central unslitted portion and including means for feeding both said unslitted edge portions and said central unslitted portion at substantially the same speed such that said strip is substantially formed into a V-shaped cross-section vertical to the advancing direction of the strip thereby forming grid cells, and each said stretching means including spaced rollers for holding the strip at both unslitted edge portions thereof, means for feeding the strip at a substantially constant speed by a contact V-shaped roller rotating at substantially the same peripheral speed as that of said spaced rollers, and a nonpowered roller for holding the strip at the central unslitted portion such that respective portions of said strip between one unslitted edge portion and the central unslitted portion and between the other unslitted edge portion and the central unslitted portion respectively engage respective side surfaces of said contact V-shaped roller, and guide means exerting frictional resistance on the zigzag slits for substantial uniform stretching thereof, each successive one of said contact V-shaped rollers in said plurality of stretching means in the advancing direction of said strip having a larger size for progressive stretching of said strip; and leveling means for leveling said substantially V-shaped strip and including a leveling guide block having a horizontal bottom surface width the same as or narrower than the width of said central unslitted portion of the strip, said horizontal bottom surface including inclined stepped surfaces formed gradually from an obtuse angle to an angle of substantially 180° in the direction of movement of the strip, and a plate mounted below said leveling guide block in spaced relation thereto for feeding the central unslitted central portion of said strip between said horizontal bottom surface and said plate.

8. Apparatus for making continuous grids as claimed in claim 7 wherein the width of each outermost projecting cutting edge row of both said first and second cutting edge rollers is greater than the width of the remaining projecting cutting edge rows of both said first and second cutting edge rollers.

9. Apparatus for making continuous grids as claimed in claim 7, and further comprising means for widening the grid cells to have a substantially uniform width in a direction transverse to the direction of movement of the strip; and means for flattening said grid cells to a substantially uniform thickness.

10. Apparatus for making continuous grids as claimed in claim 7 wherein the width of each outermost projecting cutting edge row of both said first and second cutting edge rollers is greater than the width of the remaining projecting cutting edge rows of both said first and second cutting edge rollers.

11. Apparatus for making continuous grids for lead acid batteries by intermittently advancing a strip of lead or a lead alloy along the longitudinal axis thereof, comprising:

a slit-forming means for forming zigzag slits inclined to the longitudinal axis of the strip between belt-shaped unslitted edge portions and a central unslitted portion of the strip and including spaced V-shaped upper and lower cutters each having cutting edges inclined to the advancing direction of the strip, said upper cutter being moved vertically in synchronization with the intermittent advancement of the strip and said lower cutter being fixed, the edges at the V-shaped end of the upper and lower cutters being curved;

a plurality of stretching means for applying a force having a vertical component to the plane of the strip between both unslitted edge portions and said central unslitted portion and including means for feeding both said unslitted edge portions and said central unslitted portion at substantially the same speed such that said strip is substantially formed into a V-shaped cross-section vertical to the advancing direction of the strip thereby forming grid cells, and each said stretching means including spaced rollers for holding the strip at both unslitted edge portions thereof, means for feeding the strip at a substantially constant speed by a contact V-shaped roller rotating at substantially the same peripheral speed as that of said spaced rollers, and a nonpowered roller for holding the strip at the central unslitted portion such that respective portions of said strip between one unslitted edge portion and the central unslitted portion and between the other unslitted edge portion and the central unslitted portion respectively engage respective side surfaces of said contact V-shaped roller, and guide means exerting frictional resistance on the zigzag slits for substantial uniform stretching thereof, each successive one of said contact V-shaped rollers in said plurality of stretching means in the advancing direction of said strip having a larger size for progressive stretching of said strip; and leveling means for leveling said substantially V-shaped strip and including a leveling guide block having a horizontal bottom surface width the same as or narrower than the width of said central unslitted portion of the strip, said horizontal bottom surface including inclined stepped surfaces formed gradually from an obtuse angle to an angle of substantially 180° in the direction of movement of the strip, and a plate mounted below said leveling guide block in spaced relation thereto for feeding the central unslitted central portion of said strip between said horizontal bottom surface and said plate.

12. Apparatus for making continuous grids for lead acid batteries by intermittently advancing a strip of lead or a lead alloy along the longitudinal axis thereof, comprising:

a slit-forming means for forming zigzag slits inclined at different angles to the longitudinal axis of the strip between belt-shaped unslitted edge portions and a central unslitted portion thereof and including spaced V-shaped upper and lower cutters each having cutting edges inclined to the advancing direction of the strip, said upper cutter being moved vertically in synchronization with the intermittent advancement of the strip and said lower cutter being fixed, the outermost cutting edge of each of said upper and lower cutters for forming a portion of both unslitted edge portions of the strip having a greater angle of inclination to the longitudinal axis than the remaining cutting edges of each of said upper and lower cutters;

a plurality of stretching means for applying a force having a vertical component to the plane of the strip between both unslitted edge portions and said central unslitted portion and including means for feeding both said unslitted edge portions and said central unslitted portion at substantially the same speed that said strip is substantially formed into a V-shaped cross-section vertical to the advancing direction of the strip thereby forming grid cells, and each said stretching means including spaced rollers for holding the strip at both unslitted edge portions thereof, means for feeding the strip at a substantially constant speed by a contact V-shaped roller rotating at substantially the same peripheral speed as that of said spaced rollers, and a non-powered roller for holding the strip at the central unslitted portion such that respective portions of said strip between one unslitted edge portion and the central unslitted portion and between the other unslitted edge portion and the central unslitted portion respectively engage respective side surfaces of said contact V-shaped roller, and guide means exerting frictional resistance on the zigzag slits for substantial uniform stretching thereof, each successive one of said contact V-shaped rollers in said plurality of stretching means in the advancing direction of said strip having a larger size for progressive stretching of said strip; and leveling means for leveling said substantially V-shaped strip and including a leveling guide block having a horizontal bottom surface width the same as or narrower than the width of said central unslitted portion of the strip, said horizontal bottom surface including inclined stepped surfaces formed gradually from an obtuse angle to an angle of substantially 180° in the direction of movement of the strip, and a plate mounted below said leveling guide block in spaced relation thereto for feeding the central unslitted central portion of said strip between said horizontal bottom surface and said plate.

* * * * *